United States Patent
He et al.

(10) Patent No.: US 11,546,596 B2
(45) Date of Patent: Jan. 3, 2023

(54) DYNAMIC CODEC ADAPTATION

(71) Applicant: Meta Platforms, Inc., Menlo Park, CA (US)

(72) Inventors: Yaming He, Redmond, WA (US); Zhengping Zuo, Medina, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/724,051

(22) Filed: Dec. 20, 2019

(65) Prior Publication Data

US 2020/0128246 A1    Apr. 23, 2020

Related U.S. Application Data

(62) Division of application No. 15/177,137, filed on Jun. 8, 2016, now Pat. No. 10,523,939.

(60) Provisional application No. 62/274,113, filed on Dec. 31, 2015.

(51) Int. Cl.
| | |
|---|---|
| *H04N 19/124* | (2014.01) |
| *H04N 19/154* | (2014.01) |
| *H04N 19/132* | (2014.01) |
| *H04N 19/156* | (2014.01) |
| *H04N 19/147* | (2014.01) |
| *H04N 19/177* | (2014.01) |

(52) U.S. Cl.
CPC ......... *H04N 19/124* (2014.11); *H04N 19/132* (2014.11); *H04N 19/147* (2014.11); *H04N 19/154* (2014.11); *H04N 19/156* (2014.11); *H04N 19/177* (2014.11)

(58) Field of Classification Search
CPC .................................................. H04N 19/156
See application file for complete search history.

(56) References Cited

U.S. PATENT DOCUMENTS

| | | | | |
|---|---|---|---|---|
| 5,832,125 | A  * | 11/1998 | Reese ................. | H04N 19/159 |
| | | | | 382/239 |
| 6,697,567 | B1 * | 2/2004 | Suzuki ................ | H04N 9/8042 |
| | | | | 375/240.03 |
| 2003/0169933 | A1 | 9/2003 | Song et al. | |
| 2004/0117427 | A1* | 6/2004 | Allen ................. | H04N 21/2662 |
| | | | | 709/200 |
| 2007/0097257 | A1* | 5/2007 | El-Maleh ........... | H04N 21/2662 |
| | | | | 348/419.1 |
| 2008/0247462 | A1* | 10/2008 | Demos ................ | H04N 19/597 |
| | | | | 375/240.03 |
| 2009/0148058 | A1 | 6/2009 | Dane et al. | |

(Continued)

OTHER PUBLICATIONS

Baroncini, V., et al., "Variable Frame Rate Control Jerkiness-Driven", Journal of Real-Time Image Processing, vol. 4, No. 2, Jun. 1, 2009 (Year: 2009), pp. 167-179.

*Primary Examiner* — Clifford Hilaire
(74) *Attorney, Agent, or Firm* — Sheppard Mullin Richter & Hampton LLP

(57) ABSTRACT

Embodiments are described for dynamically adapting video encoding to maintain a nearly stable frame rate based on processor capabilities and bandwidth, for example, by varying a quantization parameter. The quality of the encoded video can be varied to maintain the nearly constant frame rate, which may be measured from the number of encoded video frames being transmitted over a network interface.

20 Claims, 6 Drawing Sheets

(56) References Cited

U.S. PATENT DOCUMENTS

| | | | |
|---|---|---|---|
| 2009/0315886 A1* | 12/2009 | Drive | H04N 21/2662 345/428 |
| 2010/0250766 A1* | 9/2010 | Riggert | H04N 21/234318 709/231 |
| 2013/0013803 A1* | 1/2013 | Bichot | H04L 65/80 709/231 |
| 2013/0204927 A1 | 8/2013 | Kruglikov et al. | |

* cited by examiner

DYNAMIC CODEC ADAPTATION

CROSS REFERENCE TO RELATED APPLICATIONS

This patent application is a divisional of U.S. patent application Ser. No. 15/177,137, filed on Jun. 8, 2016 and entitled "DYNAMIC CODEC ADAPTATION" which claims the benefit of U.S. Provisional Patent Application No. 62/274,113, filed on Dec. 31, 2015, entitled "DYNAMIC CODEC ADAPTATION". The entire content of the before-mentioned patent application is incorporated herein by reference in its entirety.

BACKGROUND

Universal availability of digital video cameras and storage products has enabled new uses of digital video. In contrast to the traditional network delivery of video (e.g., digital satellite or cable television), an increasing amount of video is being captured by users using their cameras and smartphones and shared over the Internet with others.

Although the availability of Internet-connected video capturing devices (e.g., mobile computing devices) has soared, the ability of these devices to encode, or compress, and upload the captured audio/video content remains limited. Furthermore, these devices, such as Internet-connected cameras, tablets and smartphones, may frequently be offline and thus rely on a service provider to make content captured from the devices available to others at the time and place others want to view the content. As an example, users may employ a social networking service to share their videos.

These videos can be encoded by mobile computing devices, for example, prior to an upload process to a server computing device, or by a server computing device of the social networking service, for example, prior to a download process to mobile computing devices.

Video coders and decoders ("codecs") commonly use constant bitrate and/or variable bitrate compression schemes. Constant bitrate ("CBR") means that a constant number of bits is available per frame. This can result in wasted bits when the scene between frames does not change very much. Variable bitrate ("VBR") means that a variable number of bits is available per frame. Although this can be beneficial when the scene between frames does not change very much, it may require too many bits when the scene changes rapidly between frames. Neither the CBR nor the VBR encoding or compression schemes, however, accounts for processor speeds or fluctuations in data communications bandwidth. Data compression and encoding can require significant processing and, if data communications bandwidth varies over time, the time required to communicate an average number of bits can fluctuate. These changes can cause the communicated frame rate to vary. When frame rates vary, the resulting video can appear to be choppy or pose other problems for viewers.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
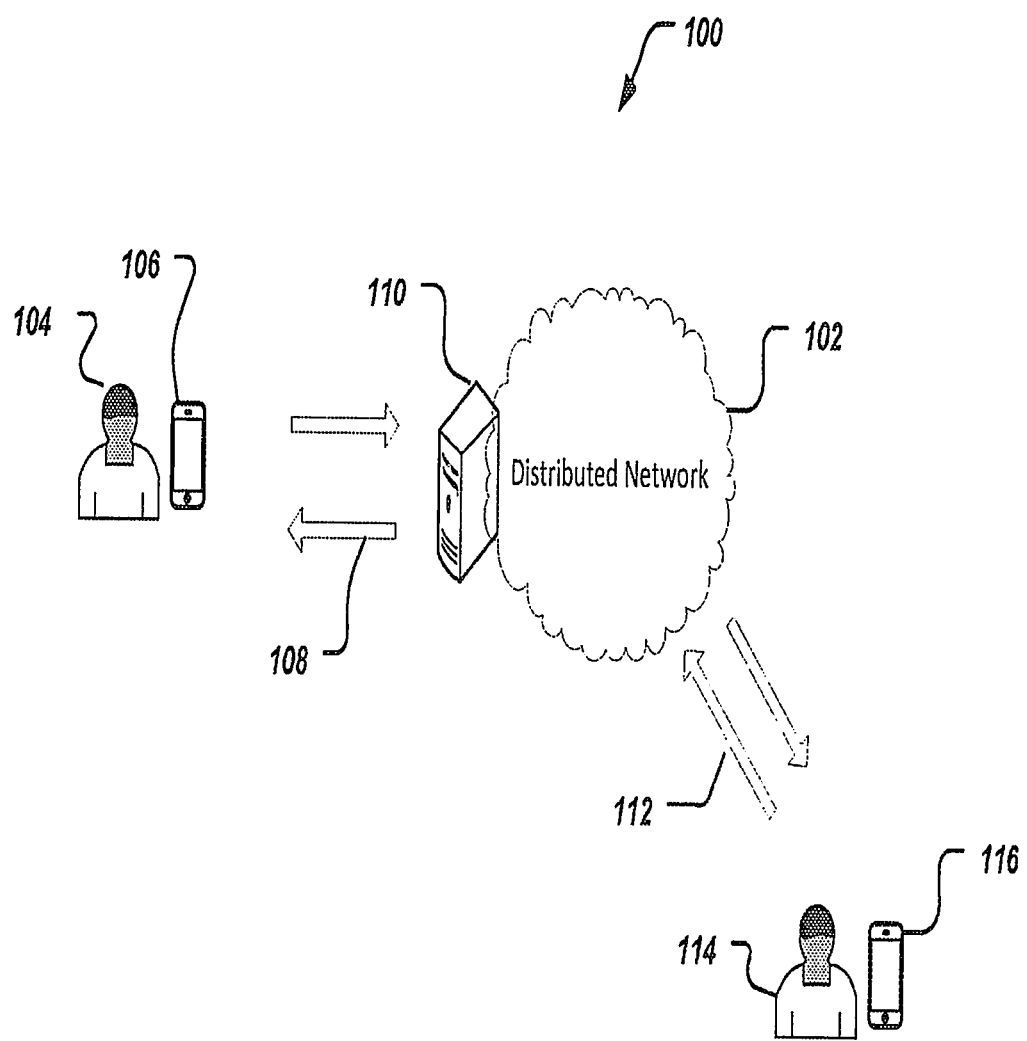
FIG. 1 is a block diagram illustrating an example of a communication network for video uploading and sharing, consistent with various embodiments.

Although the flow and sequence diagrams presented herein show an organization designed to make them more comprehensible by a human reader, those skilled in the art will appreciate that actual data structures used to store this information may differ from what is shown in that they, for example, may be organized in a different manner, may contain more or less information than shown, may be compressed and/or encrypted, etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Embodiments are described for dynamic codec adaptation. Rather than vary bitrate, which can cause changes in video frame rates, the disclosed embodiments adjust encoder parameters so as to achieve a specified, or target, frame rate. As described herein, the quality of video recorded or viewed on a user device (e.g., a mobile device, such as a phone or a tablet computer) can be impacted by processor speed and network bandwidth. Video encoding/compression schemes can provide varying quality of video, for example, as measured by a quantization parameter (QP). Dynamically adapting the codecs and/or their parameters can improve overall user experience with video. In various embodiments, a codec can determine if a frame rate is stable and at a specified frame rate. If it is, the codec can determine the present QP at that time. Thereafter, the codec can vary the quality or resolution of the video frames to achieve the frame rate. Thus, although the quality (e.g., resolution) of the video may fluctuate, for example, based on available bandwidth, the frame rate will be nearly constant.

When video is encoded, there are generally preferable output frame rates. As an example, 24 or 30 frames per second are generally acceptable frame rates for video for providing a look-and-feel of real-time video rendering to a viewer. Because computing devices have various capabilities, processor speeds, and bandwidth available for communicating (e.g., uploading or downloading) video, they may generate video at different frame rates if a particular quality video is used. However, it may instead be preferable to vary the quality of the video to achieve a particular frame rate (e.g., 30 frames per second). Block-based video encoding is generally a "lossy" process that compresses video data by removing redundant data and varying various quality parameters. As an example, a quality parameter may be the Quantization Parameter (QP) in the IEEE H.264 standard can specify how much spatial data is saved during encoding. When QP is very small, almost all detail is retained; but as QP is increased, some detail is lost so that the encoded bitrate drops and quality is lost, but frame rate can be increased.

In some embodiments, the codec additionally or alternatively varies the encoding scheme based on a processor's capabilities. As an example, if a processor used for the encoding is determined to be a slow processor, the video frames may be "downsampled." Alternatively, if a faster processor is used, the video frames may return to normal sampling or even "upsampled" to improve video quality.

Furthermore, the codec may resample (e.g., downsample) faster by selecting a QP based on the frame size. As an example, the codec may select an appropriate QP based on the resolution of a mobile device on which the video will be displayed. By selecting a QP for a target video size, the codec can cause resampling computations to be performed faster.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Network Topology

Turning now to the figures, FIG. 1 illustrates an example of a communication network 100 in which a distributed network 102 is operating to facilitate the use of digital video among multiple users: user 104, who may be the originator of a video using his user device 106, and users 114 with their user devices 116, who may download and view the video sequence that the user device 106 uploads to a server 110 in the distributed network 102. The user devices 106, 116 may communicate with the distributed network 102 via communication networks or channels 108, 112. The channels 108, 112 may be the same or different networks (e.g., the Internet or World Wide Web) and may change from time to time based on location. For example, user devices 106, 116 may include multiple network modules (e.g., a Wi-Fi modem, a 3G modem, a 4G modem, a WiMAX modem, etc.) and may use one or more of the network connections for communication in the upstream direction (from the device to the network) or the downstream direction (from the network to the device).

In one example use case, the user 104 may capture a video clip using a camera-enabled smartphone (user device 106). The user 104 may then instruct the user device 106 to upload the video to the server 110, which may be a server operated by a service provider (e.g., a social media website). Once the user device 106 uploads the video to the server 110, the service provider may operate the distributed network 102 (e.g., a geographically distributed server farm) to propagate the availability of the user's video clip to other users with whom the user 104 wishes to share the video clip, for example, user 114.

In conventional video uploading and sharing systems, a user typically cannot control the video upload process. For example, many users capture videos using their mobile phones, but cannot control the quality or other encoding parameters when the captured video is converted into a compressed digital video bitstream. Further, the user may be able to initiate video uploading to a social media website or to a service provider's file transfer protocol (ftp) site, but may not be able to control operational characteristics of the upload, such as the upload speed or quality throttling of the uploading process, in real time.

Furthermore, depending on the user's operating condition, the user's preferences for how the video should be uploaded may change. For example, when the user is on the go, the user may want uploading to happen as fast as possible, where video quality may be sacrificed to meet faster upload performance. In another operational scenario, the user may want to upload the video by encoding at the highest possible quality, for example, when the user device is operating in a Wi-Fi broadband network. In yet another operating scenario, the user may incur byte-based uploading costs and thus may want to upload a video using the minimum file size while still meeting some low quality threshold. In some embodiments, encoded video quality may be held constant, but encoding effort may be varied based on the available bandwidth for upload.

Many service providers today operate distributed computer networks that can propagate user-uploaded files to geographically distributed file stores for access from anywhere in the world. These service providers may also interface with and rely on content delivery network (CDN) infrastructure.

The techniques disclosed herein can be used to, among other uses, address the shortcomings of present-day video uploading and processing in a distributed network. These and other details are disclosed in the present document.

Video cameras (phones, DSLRs, video cameras, GoPro™) normally capture video at a very high quality and high resolution. In order to maximize quality and reduce the processing load on the consumer device, the devices usually perform only a light encode, which means that the high video quality and resolution requires a very high bitrate. Such devices therefore generate a lot of bits for captured video.

Many video sharing sites will lower the video quality before displaying the video to users. It may thus be wasteful to send the high quality video up to the video sharing site because higher quality videos typically require more bandwidth and may require a longer upload time. In one advantageous aspect, the disclosed embodiments can encode videos at the client side to match the video quality that the video sharing site will use.

Since video quality, video bitrate, and CPU cycles are often related and controlled by the encoding settings, the encoding at the user device can be controlled to match available upload resources, for example, bandwidth, CPU power and battery life. Every client device will have a different amount of upload bandwidth available (e.g., depending on the network, such as Wi-Fi, cell, or fixed) and will have a different amount of CPU power available (high end servers, low end desktops, laptops, tablets or phones).

Figure 2:
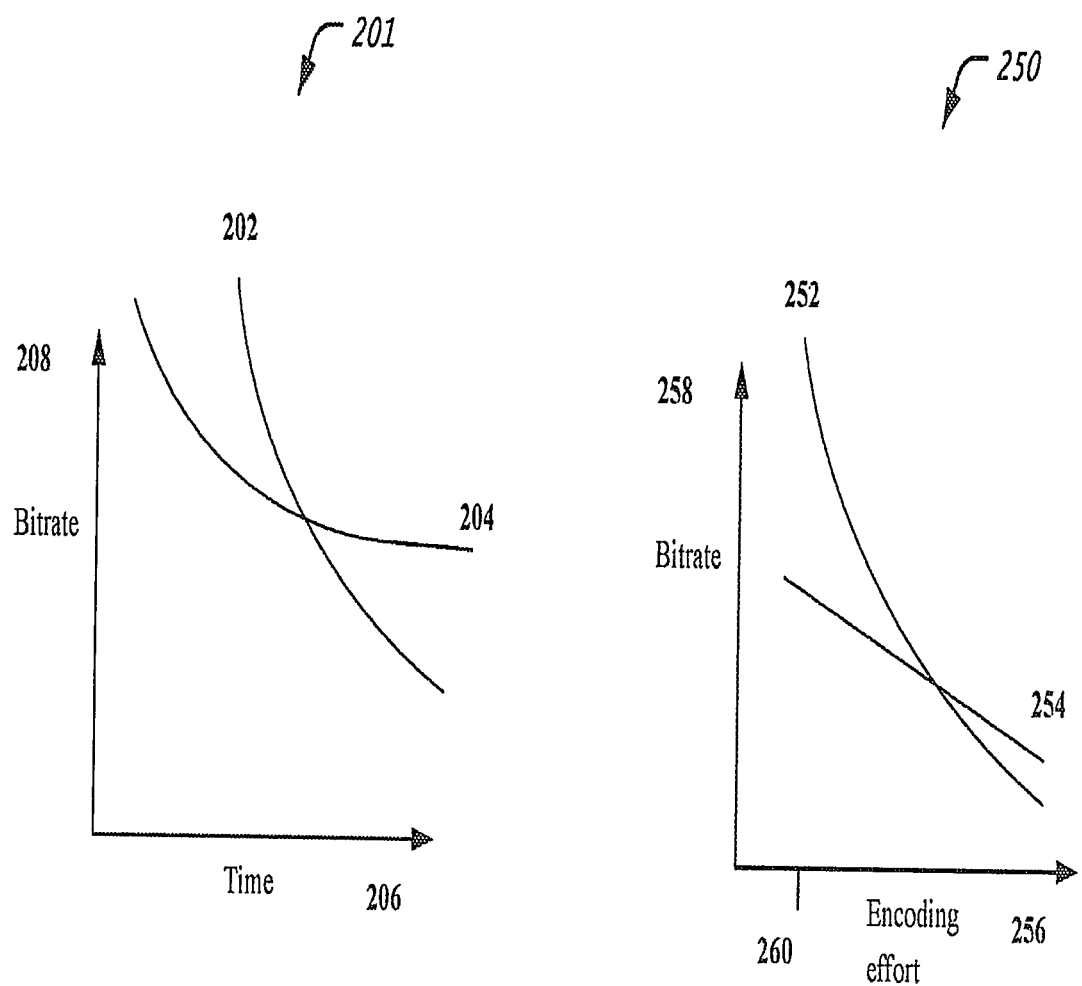
FIG. 2 is a curve diagram illustrating relationships between encoding time and quality and video bitrate and encoding effort, consistent with various embodiments.

FIG. 2 illustrates an example graph 201 of trade-offs possible in encoding digital video for a given output bitrate of an encoder. The curve 202 may represent the operation of a software-based video encoding algorithm, for example, implemented mainly using a CPU or GPU of a user device. The curve 204 may represent the operation of a graphics-processor (GPU) based video encoding algorithm, for example, implemented mainly using the parallelized pipeline of encoding, as is found in prevalent GPUs. The curves 202, 204 are plotted with the horizontal axis 206 representing a measure of complexity of encoding, for example, based on the amount of time taken for per-frame encoding, and the vertical axis 208 representing the resulting video bitrate of the resulting video.

As can be seen from curves 202, 204, in general for a given encoding implementation (e.g., GPU-based or CPU-based), the more time an encoder spends on the encoding, the better the quality of the resulting encoded video tends to be. As the amount of time spent per frame increases, however, benefit of encoded video size reduction may taper off for GPU-based encoding.

In some disclosed embodiments, the target output video quality is set to a fixed level, and then encoding settings are continuously adjusted such that upload bandwidth is maximally consumed and available CPU or GPU capacity is maximally consumed. This ensures that the upload occurs as quickly as possible. On a device with low-powered CPU or GPU and a high bandwidth connection, an embodiment may only lightly encode the uploaded video. If the video were encoded more diligently, thus taking more time, then the upload bandwidth would not be fully used and the upload would take longer.

On a powerful device with a low bandwidth Internet connection, an embodiment may apply strong encoding to use as much CPU power as possible and compress the video as much as possible to fit through the limited upload bandwidth.

In both these cases, the video quality may be set to a constant value to match the optimal or desired settings of the video sharing site.

In FIG. 2, graph 250 illustrates the difference between video bitrate, shown by curve 254, and the encoding bitrate, represented by curve 252. In the graph 250, the horizontal axis 256 represents the encoding effort or processor resources spent and the vertical axis 258 shows the resulting bitrate. Operational point 260 represents a case where video encoding may be performed, for example, at ten times the real-time rate (e.g., 300 frames encoded in one second for a 30 frames per second playback rate) as shown by the fact that the encoding bitrate curve 252 is much higher at operational point 260 than the video bitrate curve 254. The video bitrate of an encoder may represent the number of encoding bits per second used for encoding the video. For example, when the video bitrate of an encoded video is 1 Mbps, then approximately 1 million bits from the encoded video may be used by a decoder every second during decoding and playback of the video. By contrast, if an encoder is operating at 10× speed, then the encoder generates the 1 Mbps video at an encoder rate of 10 Mbps. During operation of a video encoder, the encoder bitrate and the video bitrate may be related by the equation encoder bitrate=video bitrate×encoding speed. Thus, when the encoder is operating at 10× real-time speed, then the encoder bitrate is ten times more than the video bitrate. The encoder bitrate may non-linearly change as a function of the CPU time setting during operation, for example, based on how much time is spent in CPU processing for encoding each frame. The intersection between the two curves 252, 254 may represent the operational point when video encoding is being performed in real time such that the encoding rate and the video bitrate are equal. The graph 250 illustrates a difference between video bitrate (e.g., the size (in bits) of a video, divided by the playback duration of the video) and encoder bitrate, which is the rate at which an encoder is outputting the encoded bitstream.

However, the curves of FIG. 2 do not account for frame rate. In various embodiments disclosed herein, frame rates are attempted to be held as constant as possible. This is accomplished using the methods discussed below.

Figure 3:
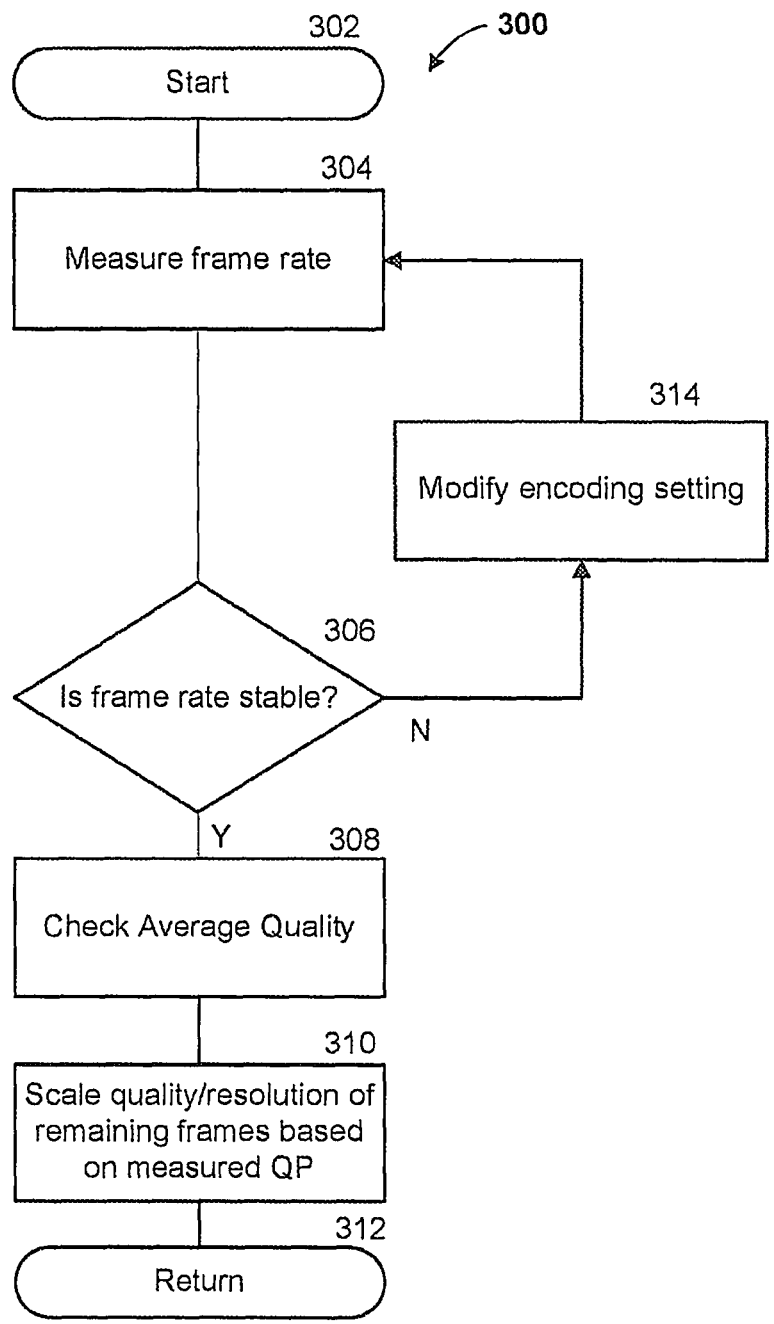
FIG. 3 is a flow diagram illustrating a method for implementing dynamic codec adaptation, consistent with various embodiments.

FIG. 3 is a flow diagram, illustrating a method 300 for implementing dynamic codec adaptation, consistent with various embodiments. The method 300 begins at block 302. At block 304, the method 300 measures a current frame rate observed by the codec. As an example, the current frame rate may indicate how many frames per second the codec is presently encoding and/or communicating frames. At decision block 306, the method 300 determines whether the frame rate is stable. In various embodiments, the method 300 may also determine whether the stable frame rate is at a desirable frame rate (e.g., 30 FPS). If the frame rate is stable, the method 300 continues at block 308. At block 308, the method 300 determines a present QP used by the codec. At block 310, for the remainder of the video (unless bandwidth availability or some other factor changes), the method 300 scales the quality or resolution of the remaining frames based on this QP. Thus, during low bandwidth conditions, the quality of the video may suffer, but the frame rate may be nearly constant. The method 300 returns at block 312 after the video has completed encoding.

When, at 306, it is determined that the frame rate is not stable, then the method 300 may, at 314, modify the video encoding operation. The frame rate may not be stable, for example, because the frame rate measured in the current period may be a threshold (e.g., 10%) below the previously measured frame rate or a target frame rate. In such cases, the method 300 may modify the video encoding operation to increase the frame rate of encoding and transfer of the remaining video. As discussed herein, one of several techniques may be used, for example, off-loading software tasks from the CPU or reduction in the resolution of video or reducing video frame rate being encoded. Alternatively, or additionally, when the frame rate is not stable because the current frame rate is above a threshold (e.g., 10%) of the previously measured frame rate, then the method 300 may modify encoding settings, at 314, to reduce the frame rate to the target frame rate. This modification of encoding settings may be achieved by, for example, increasing software-based encoding or by increasing video resolution, etc.

Figure 4:
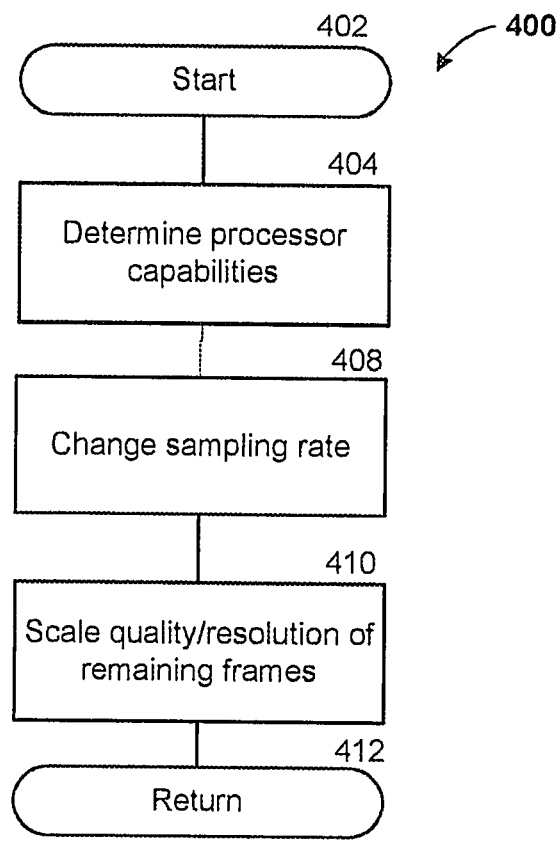
FIG. 4 is a flow diagram illustrating a method for implementing dynamic codec adaptation, consistent with various embodiments.

FIG. 4 is a flow diagram, illustrating a method 400 for implementing dynamic codec adaptation, consistent with various embodiments. The method 400 begins at block 402. The method 400 may be implemented by a user device that has a processor and a hardware circuit performing video compression.

At block 404, the method 400 determines processor capabilities. As examples, the method 400 may determine the speed of the processor, whether a hardware acceleration unit (e.g., math co-processor) or a graphics processor is available, etc. The determination of processor capabilities may include determination of time-invariant processor capabilities (e.g., capabilities that do not change during the operation of the video compression process) and time-varying processor capabilities, such as the amount of CPU resources available for performing the video encoding operation. In various embodiments, the time-varying capabilities may include one or more of—buffer space available for storing encoded video data before sending on the network interface, instantaneous network bandwidth available over a time period (e.g., a one-second window), whether some other higher priority tasks are currently being executed on the processor, and so on. For example, a task that involves direct user interaction may be given higher priority, and video codec operation may be suspended for the moment when a user is inputting to the user device or is expecting a response on the user interface.

At block 408, the method 400 varies sampling rate according to the processor capabilities. As an example, the method 400 may determine to downsample if a processor with low capabilities is used, or upsample if a processor with very high capabilities is used. The downsampling may be achieved by filtering using a lowpass filter. In some embodiments, the lowpass filter may be a one-dimensional lowpass filter. In some embodiments, the lowpass filter may be a two-dimensional filter filtering across scan lines and along scan lines.

At block 410, the method 400 scales the quality or resolution of the remaining frames accordingly. The resolution reduction may be performed in factors of two. For example, a video having a 2K resolution may be, in sequential steps, downsampled to 1K resolution, or to 512×512 pixel resolution, or to 256 pixel resolution, and so on. In some embodiments, upsampling may simply be achieved by reducing the amount of downsampling performed. For example, a video with source resolution of 1K×1K may currently be encoded at 256×256 resolution. To perform "upsampling," the method 400 may simply reduce the amount of downsampling, and instead of the current 256× 256 video, a video with "upsampled" resolution of 512×512 may be used for future video compression operation.

For altering the quality of the remaining frames, the method 400 may adjust one of several encoding parameters. Most video encoding algorithms use a variety of different parameters (e.g., a motion search window), the type of bit coding (run length, arithmetic, codebook, etc.), certain encoding modes (e.g., intra-frame motion search) and so on. The quality adjustment may be performed by adjusting encoding parameter settings of any such video encoding parameters.

The method 400 returns at block 412 after the video has completed encoding. Thus, in various embodiments, the codec execution is adaptive to the available processor capabilities. Put differently, to meet a target rate of transfer at the output (e.g., over a network interface), the use of a processor may be adaptively increased or decreased.

In various embodiments, the QP and the processor capabilities may both be considered during dynamic codec adaptation. As an example, the codec can vary the QP despite having varied quality based on the processor capabilities. Alternatively, QP may vary as a result of adaptively changing mode of codec operation (e.g., whether or not B frames are used), whether or not intra-frame motion search is performed, and so on.

Computer System

Figure 5:
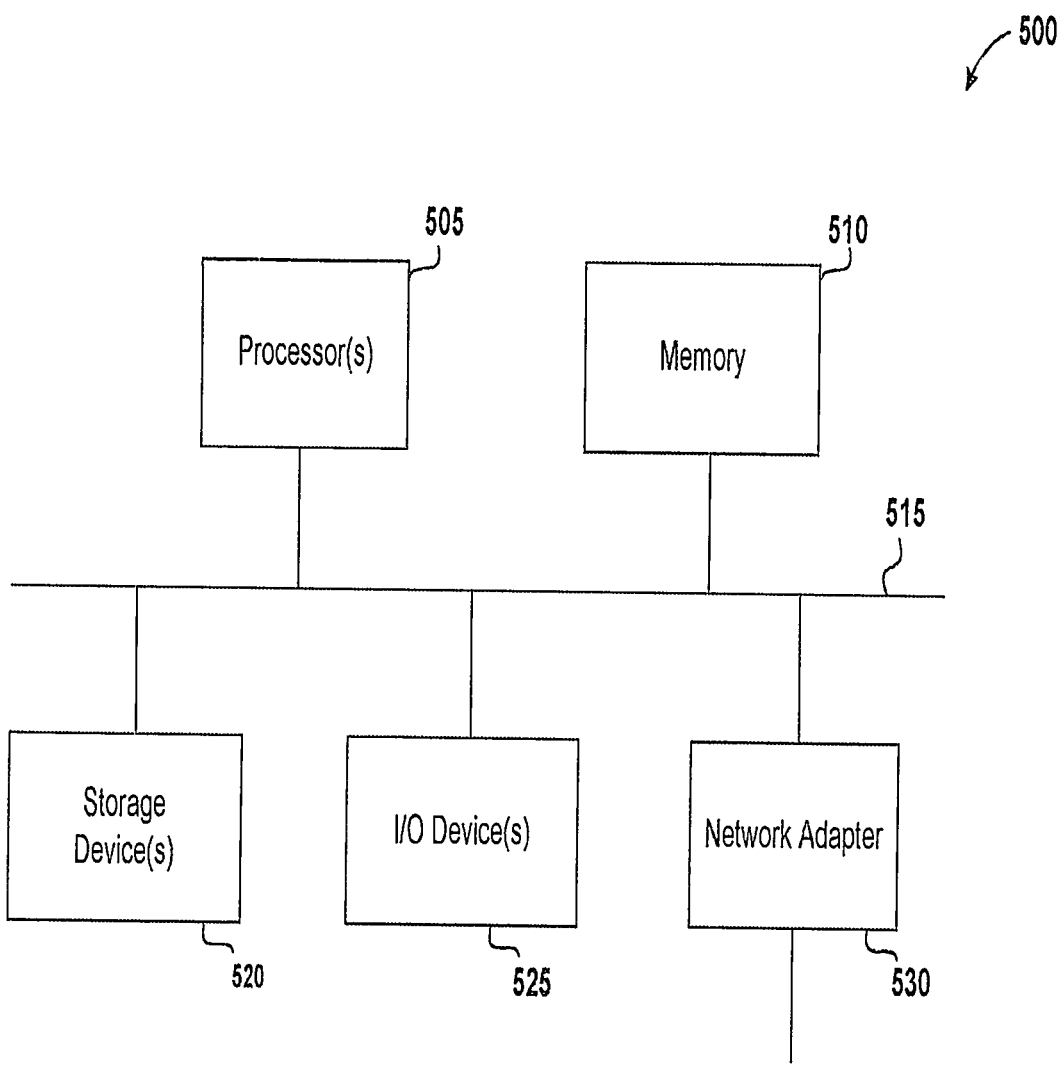
FIG. 5 illustrates an example computing device, consistent with various embodiments.

FIG. 5 is a block diagram of a computer system as may be used to implement features of some of the embodiments, for example, master nodes or worker nodes, as described herein. The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 510 and storage devices 520 are computer-readable storage media that may store instructions that implement at least portions of the various embodiments. In addition, the data structures and message structures may be stored or transmitted via a data transmission medium, for example, a signal on a communications link. Various communications links may be used, for example, the Internet, a local area network, a wide area network, or a point-to-point dial-up connection. Thus, computer readable media can include computer-readable storage media (e.g., "non-transitory" media) and computer-readable transmission media.

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530).

Figure 6:
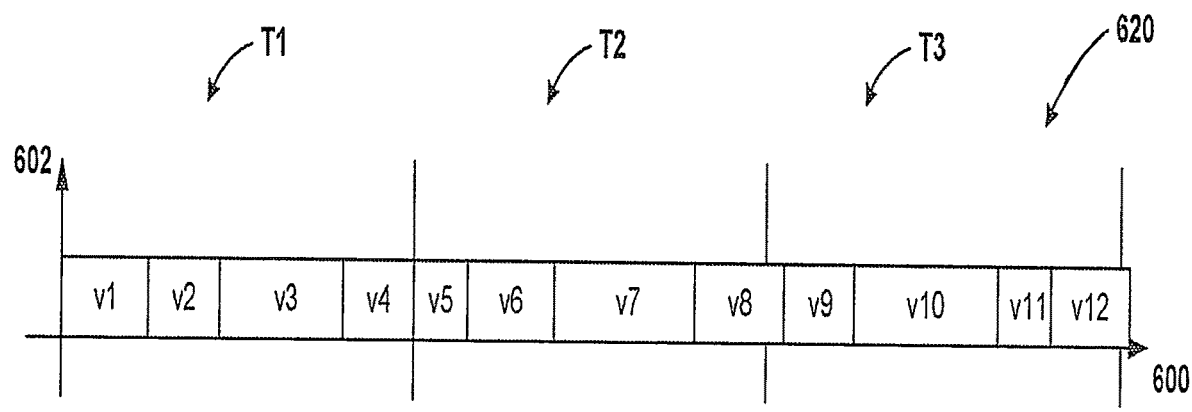
FIG. 6 illustrates an example video encoding timeline.
Figure 6:
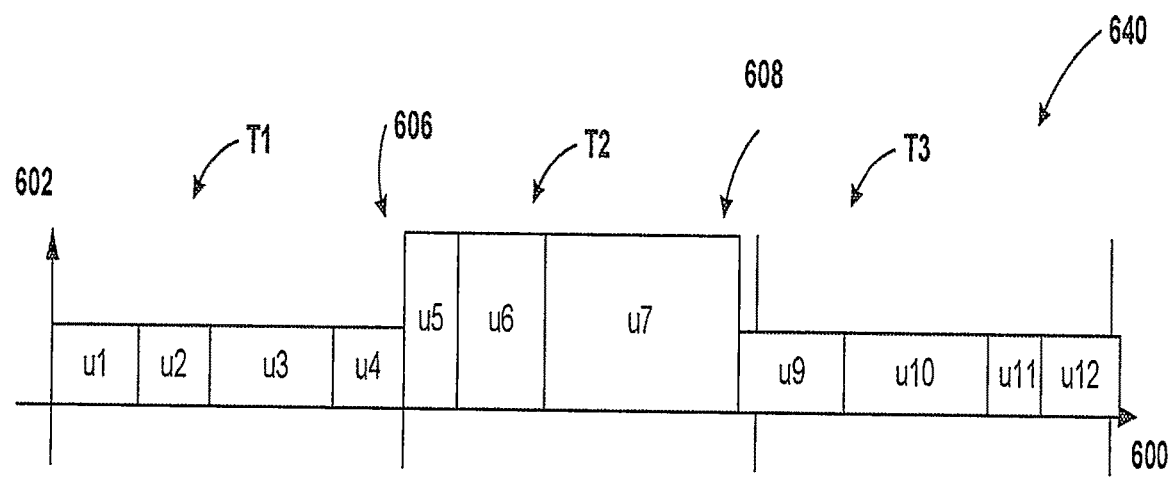

FIG. 6 shows example scenarios of video encoding operation against the timeline 600. The vertical axis 602 represents resolution of encoding.

The graph 620 shows an encoding operation in which the number of encoded video frames being transmitted out of the encoder is measured in observation time periods T1, T2 and T3. The time periods T1, T2 and T3 may be relatively identical in value, for example, within 10% accuracy of each other. The actual value of the observation time period may present a trade-off between how quickly to change video encoding parameters to keep the performance on target versus how smooth the video should look to a user. For example, if the observation time period is too short, then changes to encoding parameters may produce visually objectionable changes in the encoded video, when viewed by a viewer. On the other hand, if the observation time period is too long, then resulting implementations may have catastrophic failures, such as frame dropping due to buffer overflows in the encoder.

In the timeline graph 620, approximately four frames are shown to be encoded per observation time period only as an illustrative example. In real systems, 24 to 60 frames may be encoded every second to provide real-time motion experience to a user. Thus, if the observation periods T1, T2, T3 are 3 seconds long, then between 72 and 180 frames may be expected to be encoded and transmitted from the user device on a per-observation period basis.

In the timeline graph 620, all video frames v1 to v12 are shown to have the same resolution. The horizontal length of each video frame may be approximately proportional to the amount of time it took the encode/transmit out that frame. The "longer" frames v3, v7 and v10 may have taken a longer time to transmit out due to, for example, temporary reduction in network bandwidth when encoded bits for these frames were being transferred and/or the size of these frames being larger than that of the other encoded frames, as may happen to a first frame after a scene change.

In the timeline graph 640, at time instant 606, the system may determine that the number of frames u1, u2, u3 and u4 may represent a stable frame output rate. The system may further determine that the average quality of the encoded frames in the time interval T1 is above a quality threshold. The system may increase the resolution of subsequently encoded video frames u5, u6 and u7 in time period T2.

At the end of time period T2, indicated by time instance 608, the system may once again determine whether or not the output frame rate during the period is stable, for example, within a range (e.g., 10%) of the frame rate in the preceding time intervals. In the depicted embodiment, the system may determine that the frame rate is not stable, for example, the number of output frames has dropped from four to three (or 30 to 25, or from a higher number to a lower number), and may modify the video encoding operation (e.g., reduce video resolution) to stabilize the output frame rate.

While FIG. 6 depicts the operation based on increasing or reducing the video resolution, other encoding settings may also be used to change video output frame rate and quality from one interval to the next. The settings may include, for example, a motion search window, whether or not certain encoding options are used or not (e.g., using motion vectors in intra frames, using different sizes of motion search, whether or not arithmetic coding is used, etc.).

In some embodiments, a method of transmitting encoded video over a network interface from a user device includes measuring a present output frame rate based on a number of encoded video frames transmitted via the network interface during an observation time period, determining stability of the present output frame rate, upon determination that the present output frame rate is stable, checking whether a quality average for the number of encoded video frames transmitted via the network interface during the observation time period is above a quality threshold, and then scaling, responsive to the checking, a quality of encoding in a next observation time period. The method further includes, upon determining that the present output frame rate is not stable, modifying at least one setting of the video encoding operation to cause a future output frame rate to become stable.

In some embodiments, the present output frame rate may be calculated by using a fixed observation time period (e.g., 0.5 seconds to 1 second) and dividing the number of video frames encoded during that time period with the time period to obtain the present output frame rate. For example, in some embodiments, the observation time period may be one second. Thus, the number of frames encoded and outputted from the network interface may be numerically equal to the encoding frame rate. In some embodiments, the observation time period may be measured for a fixed number of encoded frames to be transferred via the network interface. For example, in some embodiments, the user device may track the time it took to transfer ten encoded video frames over the network, and use that time to determine the present output frame rate. For example, when 250 milliseconds are used to transmit ten encoded frames, then the present output frame rate is 40 frames per second. Similarly, when 275 milliseconds elapse while ten encoded frames are transmitted, then the present output frame rate is 36.36 frames per second.

In some embodiments, the checking includes calculating an average of QP values of the number of encoded video frames, wherein fidelity of encoding is inversely proportional to magnitudes of QP parameter values.

In some embodiments, the scaling the quality of encoding (e.g., as described with respect to methods 300 and 400) includes altering resolution of video frames before encoding the video frames, as previously described. In some embodiments, the altering the resolution includes increasing video resolution when the quality average is above the quality threshold and decreasing video resolution when the quality average is below the quality threshold.

In some embodiments, the operation of modifying at least one setting of the video encoding operation includes changing an amount of hardware acceleration used for the video encoding operation. As described herein, the change in the use of hardware acceleration may be achieved, for example, by offloading the video codec to a GPU, or by performing (or not) certain computation-intensive tasks in software (e.g., a transform calculation or a motion search).

In some embodiments, determining whether the present output frame rate is stable includes determining whether the present output frame rate is within a predetermined range of a target output frame rate. In some embodiments, the target output frame rate may be in the real-time video range, for example, between 24 to 60 frames per second. In some embodiments, the determination of stability of the present output frame rate may take into account granularity of the calculation. The granularity may be due to the granular nature of data transfer over a network connection, such as size of Internet Protocol (IP) packets used for data transmission. For example, in some embodiments, a calculated frame rate that is within 10% of the target rate or the present frame rate may be considered stable.

In some embodiments, a user device may include at least a memory, a processor and a network interface. The memory may store instructions that, when executed by the processor, cause the processor to transmit encoded video over the network interface. The instructions may include instructions for performing a video compression operation and producing encoded video frames, instructions for transferring the encoded video frames over the network interface at a present output frame rate, instructions for monitoring the present output frame rate for deviation from a target output frame rate, and instructions for selectively adjusting the quality of future encoded video frames when the present output frame rate deviates from the target output frame rate.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, by italics and/or quotation marks. The use of highlighting has no influence on the scope and meaning of a term: the scope and meaning of a term is the same, in the same context, whether or not it is highlighted. It will be appreciated that the same thing can be said in more than one way. One will recognize that "memory" is one form of "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader and should in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A computer-implemented method comprising:
   determining, by a computing system, during encoding of a video, processor capabilities for encoding the video;
   changing, by the computing system, a sampling rate of the video according to the determined processor capabilities;
   scaling, by the computing system, a quality of remaining frames of the video during the encoding based on the changed sampling rate according to the determined processor capabilities, wherein at least one remaining frame of the video is downsampled when the processor capabilities satisfy first capabilities, the scaling comprising:
      downsampling, by the computing system, at least a first remaining frame included in the remaining frames;
   measuring, by the computing system, a present frame rate of the video;
   determining, by the computing system, that the present frame rate is stable based on the present frame rate being within a threshold percentage of a previously measured frame rate; and
   in response to determining that the present frame rate is stable based on the present frame rate being within a threshold percentage of a previously measured frame rate:
      measuring, by the computing system, a present quantization parameter (QP); and
      scaling, by the computing system, a quality of remaining frames of the video during the encoding according to the QP, the quality associated with resolution of the remaining frames.

2. The method of claim 1, wherein the scaling the quality of the remaining frames includes selectively operating a hardware circuit to perform video encoding tasks for the remaining frames of the video.

3. The method of claim 2, wherein the hardware circuit comprises a filter to reduce video resolution.

4. The method of claim 1, wherein the determined processor capabilities indicate whether a hardware acceleration unit or a graphics processor is available.

5. The method of claim 1, wherein the determined processor capabilities indicate time-invariant processor capabilities or time-varying processor capabilities.

6. The method of claim 5, wherein the time-varying processor capabilities indicate at least one of an amount of buffer space available to store encoded video data before the encoded video data is sent through a network interface.

7. The method of claim 5, wherein the time-varying processor capabilities indicate an amount of instantaneous network bandwidth available over a window of time.

8. The method of claim 5, wherein the time-varying processor capabilities indicate whether other higher priority tasks are currently being executed, wherein the other higher priority tasks involve direct user interaction.

9. The method of claim 1, further comprising:
   in response to determining that the present frame rate is not stable based on the present frame rate not being within the threshold percentage of the previously measured frame rate:
      off-loading, by the computing system, software tasks from a CPU; and
      modifying, by the computing system, resolution in the video frames.

10. The method of claim 9, wherein the off-loading and the modifying are based on whether the present frame rate is greater than or less than the previously measured frame rate.

11. A system comprising:
    at least a processor; and
    a memory storing instructions that, when executed by the at least a processor, cause the system to perform:
       determining during encoding of a video, processor capabilities for encoding the video;
       changing a sampling rate of the video according to the determined processor capabilities;
       scaling a quality of remaining frames of the video during the encoding based on the changed sampling rate according to the determined processor capabilities, wherein at least one remaining frame of the video is downsampled when the processor capabilities satisfy first capabilities, the scaling comprising:
          downsampling at least a first remaining frame included in the remaining frames;
       measuring a present frame rate of the video;

determining that the present frame rate is stable based on the present frame rate being within a threshold percentage of a previously measured frame rate; and in response to determining that the present frame rate is stable based on the present frame rate being within a threshold percentage of a previously measured frame rate:

measuring a present quantization parameter (QP); and scaling a quality of remaining frames of the video during the encoding according to the QP, the quality associated with resolution of the remaining frames.

12. The system of claim 11, wherein the scaling the quality of the remaining frames includes selectively operating a hardware circuit to perform video encoding tasks for the remaining frames of the video.

13. The system of claim 12, wherein the hardware circuit comprises a filter to reduce video resolution.

14. The system of claim 11, wherein the instructions that, when executed by at least the processor of the system, cause the system to further perform:

in response to determining that the present frame rate is not stable based on the present frame rate not being within a threshold percentage of a previously measured frame rate:

off-loading software tasks from a CPU; and modifying resolution in the video frames.

15. The system of claim 14, wherein the off-loading and the modifying are based on whether the present frame rate is greater than or less than the previously measured frame rate.

16. A non-transitory computer-readable storage medium including instructions that, when executed by at least one processor of a computing system, cause the computing system to perform:

determining during encoding of a video, processor capabilities for encoding the video;

changing a sampling rate of the video according to the determined processor capabilities;

scaling a quality of remaining frames of the video during the encoding based on the changed sampling rate according to the determined processor capabilities, wherein at least one remaining frame of the video is downsampled when the processor capabilities satisfy first capabilities, the scaling comprising:

downsampling at least a first remaining frame included in the remaining frames;

measuring a present frame rate of the video;

determining that the present frame rate is stable based on the present frame rate being within a threshold percentage of a previously measured frame rate; and in response to determining that the present frame rate is stable based on the present frame rate being within a threshold percentage of a previously measured frame rate:

measuring a present quantization parameter (QP); and scaling a quality of remaining frames of the video during the encoding according to the QP, the quality associated with resolution of the remaining frames.

17. The non-transitory computer-readable storage medium of claim 16, wherein the scaling the quality of the remaining frames include selectively operating a hardware circuit to perform video encoding tasks for the remaining frames of the video.

18. The non-transitory computer-readable storage medium of claim 17, wherein the hardware circuit comprises a filter to reduce video resolution.

19. The non-transitory computer-readable storage medium of claim 16, wherein the instructions, when executed by the at least one processor of the computing system, cause the computing system to further perform:

in response to determining that the present frame rate is not stable based on the present frame rate not being within a threshold percentage of a previously measured frame rate:

off-loading software tasks from a CPU; and modifying resolution in the video frames.

20. The non-transitory computer-readable storage medium of claim 19, wherein the off-loading and the modifying are based on whether the present frame rate is greater than or less than the previously measured frame rate.

* * * * *